Oct. 10, 1950 R. TERLECKI ET AL 2,525,566

ELECTRIC BAND-PASS FILTER

Filed March 2, 1948 2 Sheets-Sheet 1

INVENTORS
RENAT TERLECKI
RONALD GRAIG LEIGH
By [signature] their ATTY.

Oct. 10, 1950 R. TERLECKI ET AL 2,525,566

ELECTRIC BAND-PASS FILTER

Filed March 2, 1948 2 Sheets-Sheet 2

INVENTORS
RENAT TERLECKI
RONALD CRAIG LEIGH
By [signature]
their ATT'Y.

Patented Oct. 10, 1950

2,525,566

UNITED STATES PATENT OFFICE 2,525,566

ELECTRIC BAND-PASS FILTER

Renat Terlecki and Ronald Craig Leigh, Taplow, England, assignors to British Telecommunications Research Limited, Taplow, England, a British company Application March 2, 1948, Serial No. 12,648
In Great Britain March 11, 1947

11 Claims. (Cl. 178—44)

The present invention relates to electric band-pass filters.

The principal object of the present invention is to provide an improved band-pass filter having a substantially constant mid-band frequency and two different bandwidths, selectable at will.

According to the present invention, a band-pass filter comprises a pair of input and a pair of output terminals, an inductance element connected between the terminals of each pair, a four-terminal network having connections between its input and output terminals and the input and output terminals respectively of the filter, a condenser being included in one or both of the input and one or both of the output connections, and switch means for giving the four-terminal network either of two constitutions, the four-terminal network comprising, in one constitution, two shunt capacitances having a capacitance in series in one or both of the connections between them, and in the other constitution a shunt capacitance, the values of capacitances being such that with both said constitutions of the four-terminal network, the mid-band frequency of the filter is substantially the same and the band width of the filter with the second-named constitution of the four-terminal network is greater than with the first-named constitution.

The invention includes arrangements of the components equivalent to those set forth. In a preferred arrangement the second-named constitution of the four-terminal network is obtained by a re-arrangement of the same condensers as are employed in the first constitution thereof.

Figure 1:
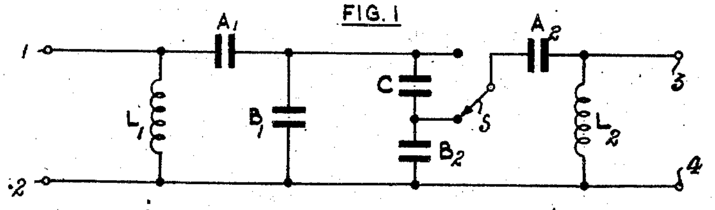
Figure 2A:
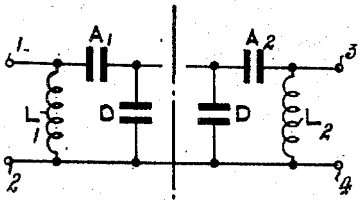
Figure 2B:
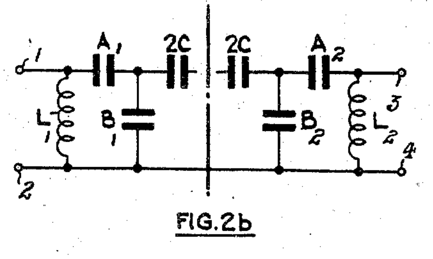
Figure 3A:
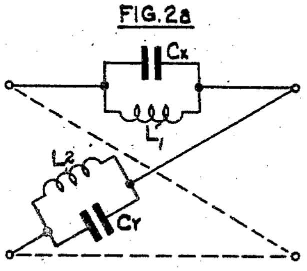
Figure 3B:
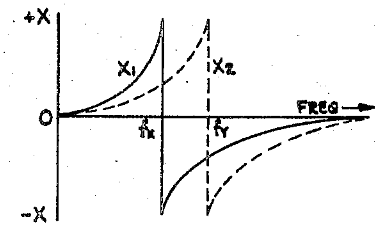
Figure 4:
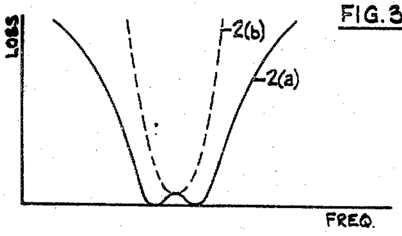
Figure 5:
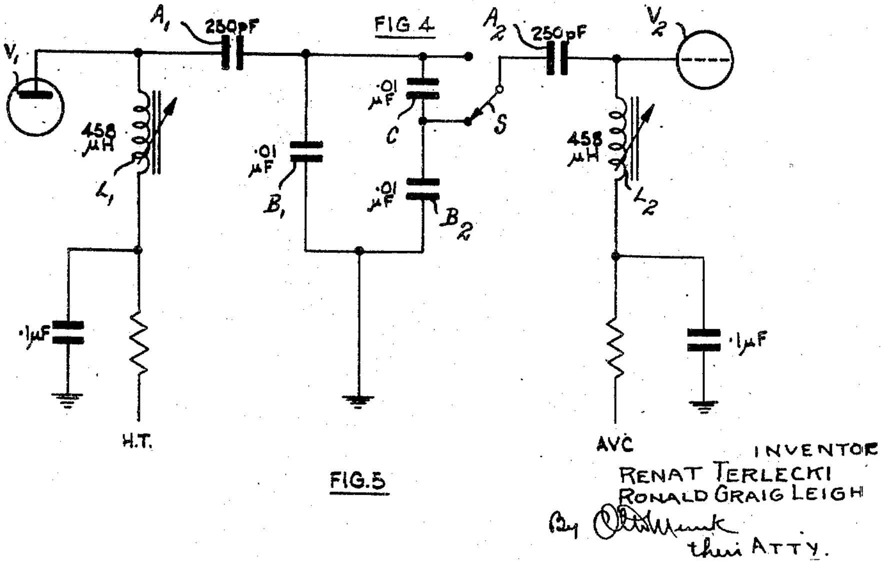
Figure 6:
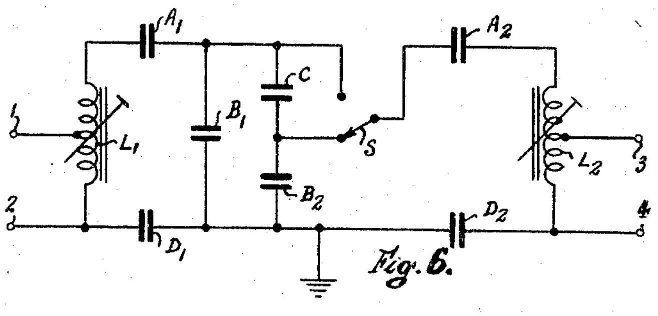
Figure 7:
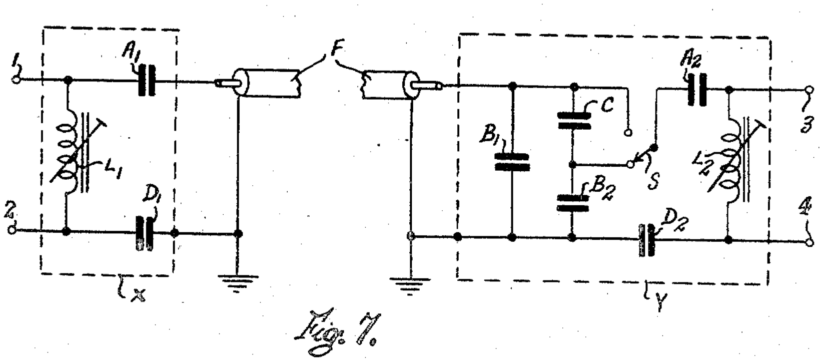
Figure 8:
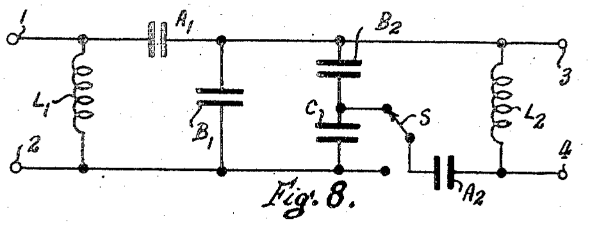
Figure 9:
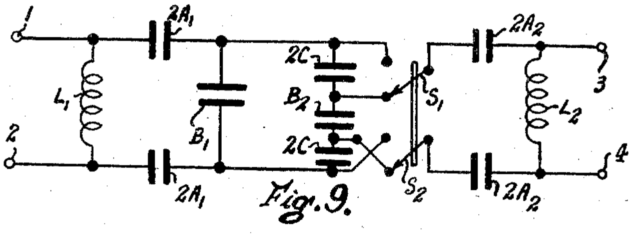
Figure 10:
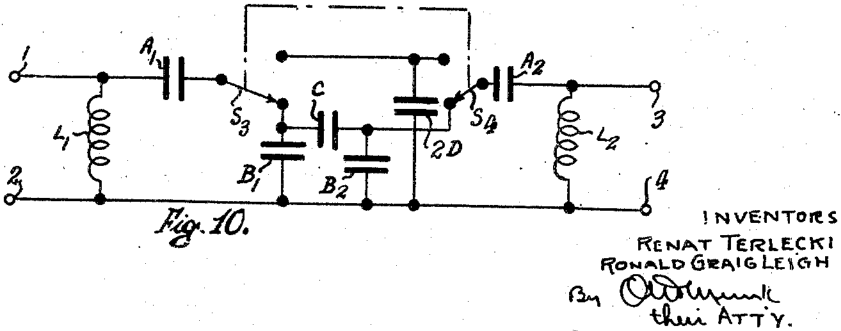

Other features of the present invention will be apparent from the following description of one embodiment thereof, which will be given with reference to the accompanying drawings, in which:

Figure 1 is a theoretical circuit diagram of a band-pass filter according to the invention, Figures 2 (*a*) and 2 (*b*) are equivalent circuit diagrams to Figure 1 in two settings of the switch therein, Figure 3 (*a*) shows the lattice structure which is electrically equivalent to the circuits of Figures 2 (*a*) and 2 (*b*), Figure 3 (*b*) shows the impedance/frequency characteristic of a circuit such as that of Figure 3 (*a*), Figure 4 shows the loss/frequency characteristic corresponding to the characteristic of Figure 3 (*b*) and Figure 5 shows a practical circuit diagram according to the invention, Figure 6 is a circuit diagram of a further arrangement according to the invention, particularly suitable where small band widths are required, Figure 7 illustrates how the filter according to a feature of the invention may be split into two parts, and Figures 8 to 10 show various re-arrangements that may be made of the circuit of Figure 1.

Referring to Figure 1, the band-pass filter shown has four terminals, 1, 2, 3 and 4, terminals 2 and 4 being directly connected to one another. Connected between terminals 1 and 2 is an inductance $L_1$ and connected between terminals 3 and 4 is an inductance $L_2$. These inductances are of substantially equal value and have no mutual-inductive coupling. Terminal 1 is connected to terminal 3 through two condensers $A_1$ and C, a switch S and a further condenser $A_2$, the values of the condensers $A_1$ and $A_2$ being substantially equal. Connected between the junction of the condensers $A_1$ and C, and the junction of the terminals 2 and 4 is a condenser $B_1$. Connected between the junction of the condensers $A_2$ and C and the junction of terminals 2 and 4 is a condenser $B_2$. The capacities of the condensers $B_1$ and $B_2$ are substantially equal.

The equivalent circuit diagram of the filter as just described, that is to say with the switch S in the position shown, is shown in Figure 2 (*b*), the condensers 2C each having twice the capacity of the condenser C of Figure 1.

When the switch S is moved to the alternative position to that shown, the equivalent circuit diagram becomes as shown in Figure 2 (*a*), wherein the condensers D each have a capacity equal to half of the total capacity of the four-terminal network constituted by condensers $B_1$, $B_2$ and C when the switch is in the alternative position. Therefore, assuming that the condensers have the values of their references, neglecting subscripts, $D=(B^2+2BC)/2(B+C)$.

From this it will be understood that the four-terminal network including the condensers $B_1$, $B_2$ and C of Figure 1 connected as shown and with the switch S as shown is replaced by a capacity of value $(B^2+2BC)/(B+C=2D$ when the switch S is moved to the alternative position.

The lattice structure shown in Figure 3 (*a*) is the equivalent of both of the circuits shown in Figures 2 (*a*) and 2 (*b*). In Figure 3 (*a*), and when the switch S is in the position shown in Figure 1, that is to say when the equivalent circuit is that shown in Figure 2 (*b*) the equivalent lattice capacities are:

$$C_x=A(B+2C)/(A+B+2C)$$
$$C_y=A.B/(A+B)$$

where $A=A_1=A_2$, $B=B_1=B_2$, and when the switch S is in the alternative position to that shown in Figure 1, that is when the equivalent circuit is that shown in Figure 2 (*a*), $$C_x=A$$
$$C_y=A.D/(A+D)$$

The lattice structure of Figure 3 (*a*) has the characteristics shown in Figure 3 (*b*), in which the ordinate represents reactance and the abscissa represents frequency. The continuous curve $X_1$ represents the relation between the frequency and the reactance of the tuned circuit constituted by the condenser $C_x$ and inductance L (Figure 3 (*a*)), $f_x$ being the anti-resonance frequency of the circuit. The broken line $X_2$ represents the relation between the frequency and the reactance of the tuned circuit constituted by the condenser $C_y$ and inductance L (Figure 3 (*a*)), $f_y$ being the anti-resonance frequency of the circuit. It will be seen from Figure 3 (*b*) that the cut-off frequencies of the filter are the anti-resonance frequencies of the two arms of the lattice structure shown in Figure 3 (*a*).

Now if the angular, lower and upper cut-off frequencies of the circuit of Figure 2 (*a*) are denoted by $\omega_1$ and $\omega_4$, and those of the circuit of Figure 2 (*b*) by $\omega_2$ and $\omega_3$ respectively, $$\omega_1^2=1/LA \quad (1)$$

$$\omega_2^2=(A+B+2C)/LA(B+2C)$$
$$=\omega_1^2(A+B+2C)/(B+2C) \quad (2)$$

$$\omega_3^2=(A+B)/L.A.B.$$
$$=\omega_1^2(A+B)/B \quad (3)$$

$$\omega_4^2=(A+D)/L.A.D.$$
$$=\omega_1^2(A+D)/D \quad (4)$$

where $L=L_1=L_2$.

As already stated D is dependent upon the values of B and C and equals $$(B^2+2BC)/2(B+C) \quad (5)$$

The values of the condensers A, B and C, however may be chosen at will. From this it follows that $\omega_1$, $\omega_2$ and $\omega_3$ may be chosen at will but the angular frequency $\omega_4$ will then be fixed as given by Equations 4 and 5.

From Equation 3:

$$B=\omega_4^2A/(\omega_3^2-\omega_1^2) \quad (6)$$

and inserting this value in Equation 2

$$C=\omega_1^2A(\omega_3^2-\omega_2^2)/2(\omega_3^2-\omega_1^2)(\omega_2^2-\omega_1^2) \quad (7)$$

By inserting the values for B and C, given by Equations 6 and 7 respectively, in Equation 5, and simplifying:

$$D=\omega_1^2A/(\omega_3^2+\omega_2^2-2\omega_1^2) \quad (8)$$

Therefore $$\omega_4^2=\omega_1^2(A+D)D$$
$$=\omega_3^2+\omega_2^2-\omega_1^2$$

and $$\omega_4^2+\omega_1^2=\omega_3^2+\omega_2^2 \quad (9)$$

Provided that $(\omega_4-\omega_1)$, (that is to say the total bandwidth, is small compared with $\omega_1$ then:

$$\omega_4+\omega_1 \doteqdot \omega_3+\omega_2$$

which indicates that the filter has substantially the same mid-band frequency in both positions of the switch S.

Theoretically the termination of the filter should be changed when the switch S is operated, as the value of L is given by:

$$L=R(\omega_y-\omega_x)/\omega_x\omega_y \quad (10)$$

where R is the terminating impedance. However, if the nominal band is chosen to be such that it is the geometric mean of the two bands, that is to say if $$(\omega_y-\omega_x)=\sqrt{(\omega_4-\omega_1)(\omega_3-{}_2)} \quad (11)$$

where $\omega_y$ and $\omega_x$ represent the angular frequencies of $f_y$ and $f_x$ respectively, then the filter will be equally mismatched at the mid-band frequency, in both positions of the switch S, and the loss at the mid-band frequency will be constant. Owing to the coupling impedance of the filter being of the shunt type when the switch S is set to provide the wide band characteristic, and owing to the above mentioned mismatch, the resonance curve will exhibit a "double-hump" characteristic.

Typical characteristics are shown in Figure 4, in which the ordinate represents loss, the abscissa represents frequency. The full line 2 (*a*) represents the loss of the filter against frequency when the circuit is as shown in Figure 2 (*a*), and the broken line 2 (*b*) represents the loss of the filter against frequency when the circuit is as shown in Figure 2 (*b*).

The element values of the filter shown in Figure 1 can be calculated from:

$$L=R\sqrt{(\omega_4-\omega_1)(\omega_3-\omega_2)/\omega_m^2}$$

where $\omega_m$ is the angular mid-band frequency.

$$A=1/\omega_1^2L$$
$$B=A\omega_1^2/(\omega_3^2-\omega_1^2)$$
$$C=B(\omega_3^2-\omega_2^2)/2(\omega_2^2-\omega_1^2)$$

The fact that the mid-band frequency is unchanged when the band-width is altered, is of particular advantage in the case of narrow band filters. Using coils $L_1$ and $L_2$ with Q values of 240, a filter may be obtained having band-widths of 1,500 and 3,000 C. P. S. Typical element values for such filters are $L_1=L_2=235$ microhenries, $A1=A2=500$ pf. $B1=B2=C=.05$ $\mu$f. and the characteristic impedance 145,000 ohms. For narrow band-widths it is necessary to keep the impedance as high as possible in order to keep the values of B and C within reasonable limits. This may in some cases result in too high a gain per stage when the filter is used in conjunction with an amplifier. This may be avoided by providing taps on either one or both of the coils as shown in Figure 6 for connection to one or both input and/or one or both output terminals. The tap on $L_1$ reduces the impedance in the anode circuit of the preceding valve in the ratio $$N_1^2/(N_1+N_2)^2$$

and steps up the voltage in the ratio $$(N_1+N_2)/N_1$$

thus giving the overall reduction in voltage across $L_1$ of ratio $N_1/(N_1+N_2)$, where $N_1$ and $N_2$ are respectively the numbers of turns in the part of the coil between terminals 1 and 2 and in the other part. Similarly the tap on $L_2$ steps down the voltage in the same ratio. This also has the advantage that the shunt resistances of the preceding and following valves appear only across part of the coils, the effective Q of which is therefore less affected by the external circuits than when no tapping is used.

Usually the filter according to the invention will be required to operate between high impedances, for example pentodes, and the inductances $L_1$ and $L_2$ will provide the terminations for the filter.

The shunt resistance of an inductance of value L is given by:

$$R_{SH}=\omega LQ$$

where $\omega$ is the angular frequency of the voltage applied to the inductance, and $Q=\omega L/R$.

Substituting for L from Equation 10

$$R_{SH}=\omega R(\omega_y-\omega_x)Q/\omega_m^2$$

assuming that $\omega=\omega_m$.

$$R_{SH}=R(\omega_y-\omega_x)Q/\omega_m$$

Now $R_{SH}$ must be equal to, or greater than, R and hence the minimum value of Q for correct termination is given by $$Q=\omega_m/(\omega_y-\omega_x)$$

where $(\omega_y-\omega_x)$ is the mean band width in angular frequency. If the Q obtained is greater than this value the correct terminating resistance can be obtained by shunting the inductances with appropriate resistors.

The way in which a filter according to the present invention may be embodied as coupling between two amplifying valves is shown in Figure 5.

The filter shown is disposed between the anode circuit of a valve $V_1$ and the grid circuit of a valve $V_2$. Suitable values of the components of the filter are shown in the figure for the case where the alternative bandwidths of the filter are 4,400 and 8,800 C./S. and the impedance of the filter is 100,000 ohms. The mean bandwidth is 6,200 C./S., and hence a minimum Q of 75 is required, a value which is readily obtainable in practice. Furthermore components of the values shown are readily obtainable. The inductances $L_1$ and $L_2$ are shown to have variable permeability cores, whereby they may readily be tuned to the mid-band frequency without affecting the bandwidth. Moreover, the values of the condensers $A_1$, $A_2$, $B_1$, $B_2$ and C are not very critical. The decoupling condensers $D_1$ and $D_2$ across the anode and grid load resistors $R_1$ and $R_2$ respectively of Figure 5 may be arranged to form part of the filter circuit as shown in Figure 6.

This is sometimes necessary for narrow band filters as changes in the decoupling condensers may affect the mid-band frequency of the filter. The condensers should therefore be of a stable type.

Figure 7 illustrates another feature of the invention, namely that the filter may be split up into two parts, such as X and Y in this figure. Owing to the low impedance presented by the fairly large shunt capacity constituted by the condensers $B_1$, $B_2$ and C, that is by the four-terminal network hereinbefore referred to, these parts X and Y can be joined together by means of coaxial cable F without affecting the performance of the filter. This is of particular importance where it is desired to mount a frequency changer on one panel and an I. F. amplifier on a separate panel. Similarly if several outputs are required, several coaxial cables can be connected to the unit marked X and each cable equipped at its far end by a unit similar to the one marked Y. If two or more outputs are required, the whole filter will consist of firstly a single section comprising the inductance $L_1$ and condensers $A_1$ and $D_1$, and secondly a number of filter sections with their inputs connected in parallel. In order to allow for the use of parallel sections of filter, the component values of all the individual sections, including the input section, will need to be modified in accordance with known principles of filter design.

Equivalent arrangements of the condensers $A_1$, $A_2$, $B_1$, $B_2$ and C of Figure 1 may be used. Thus, for example, as shown in Figure 8, the condenser $A_2$ may be connected in the lower arm while the condenser C may be arranged in the lower connection between the condensers $B_1$ and $B_2$, the switch S being connected as shown.

In Figure 9 the condensers $A_1$ and $A_2$ are shown equally distributed, as $2A_1$ and $2A_2$ respectively, in the upper and lower arms. Moreover in this figure the condenser C is shown replaced by two condensers 2C and two switches $S_1$ and $S_2$ ganged together are connected as shown.

Instead of utilising the condensers $B_1$, $B_2$ and C to provide the shunt capacity 2D when the switch S is moved to the alternative position to that shown, a separate condenser having a value equal to 2D may be provided as shown in Figure 10, and a suitable switch system including ganged parts $S_3$ and $S_4$ may be used in place of S for disconnecting the condensers $B_1$, $B_2$ and C from the circuit.

We claim:

1. A band-pass filter comprising a pair of main input terminals, a pair of main output terminals, an inductance element connected between each of said pairs of terminals, a four terminal network having a pair of subsidiary input terminals and a pair of subsidiary output terminals, first connections including capacitance between said main and subsidiary input terminals respectively, second connections including capacitance between said main and subsidiary output terminals, and switch means for giving either of two constitutions to said four-terminal network, said four-terminal network comprising in one of said constitutions a combination of two shunt condenser elements and a condenser element in series in at least one of the connections between said shunt condenser elements, and in the other of said constitutions a shunt condenser element, the values of said capacitances and the value of said combination in the first said constitution in relation to the value of said shunt condenser element in the second said constitution being selected to provide substantially the same mid-band frequency, but a band width greater with the second said constitution than with the first said constitution.

2. A band-pass filter comprising a pair of main input terminals, a pair of main output terminals, an inductance element connected between each of said pairs of terminals, a four terminal network having a pair of subsidiary input terminals and a pair of subsidiary output terminals, first connections including capacitance of value A between said main and subsidiary input terminals respectively, second connections including capacitance of value A between said main and subsidiary output terminals, and switch means for giving either of two constitutions to said four-terminal network, said four-terminal network comprising in one of said constitutions a combination of two shunt condenser elements each of capacitance B and a condenser element in series in at least one of the connections between said shunt condenser elements giving an effective series capacitance C and in the other of said constitutions a shunt condenser element of capacitance 2D, the said filter being constituted as substantially the equivalent of a lattice network having as series arms an inductance in parallel with a capacitance of value $C_x$, and as diagonal arms in inductance in parallel with a capacitance of value $C_y$, where, in said first constitution, the equations $C_x=A(B+2C)/(A+B+2C)$ and $C_y=A.B/(A+B)$ and in said second constitution, the equations $C_x=A$ and $C_y=A.D/(A+D)$ are substantially satisfied.

3. A band-pass filter comprising main input and output terminals, a first inductance element connected between said input terminals, a second inductance element connected between said output terminals, a four-terminal network having subsidiary input and output terminals, connections including capacitance between said main and subsidiary input terminals and said main and subsidiary output terminals, and a switch device for giving to said four-terminal network two alternative constitutions, said network comprising in the first of said constitutions two shunt capacitance elements and a further capacitance element in series in at least one of the connections between said shunt capacitance elements and in the second of said constitutions a shunt capacitance.

4. A filter according to claim 3, wherein the said capacitance elements in said two constitutions are constituted by the same condensers, said switch device serving to change the connections of said condensers.

5. A filter according to claim 3, wherein said first inductance element constitutes a part of an input inductor, said connections between said input terminals including the other part of said input inductor.

6. A filter according to claim 3, wherein said second inductance element constitutes a part of an output inductor, said connections between said output terminals including the other part of said output inductor.

7. A band-pass filter comprising main input and output terminals a first inductance element connected between said input terminals, a second inductance element connected between said output terminals, a four-terminal network having subsidiary input and output terminals, a first connection between said main and subsidiary input terminals, said first connection comprising a coaxial cable connected through capacitance to said main input terminals, a second connection containing capacitance between said main and subsidiary output terminals, and a switch device for giving to said four terminal network two alternative constitutions, said network comprising in the first of said constitutions two shunt capacitance elements and a further capacitance element in series in at least one of the connections between said shunt capacitance elements and in the second of said constitutions a shunt capacitance.

8. A band-pass filter system comprising a pair of main input terminals, two pairs of main output terminals, a first inductance element connected between said main input terminals, a second inductance element connected between each of said pairs of main output terminals, two four-terminal networks each having a pair of subsidiary input and a pair of subsidiary output terminals, connections between said main input terminals and each of said pairs of subsidiary input terminals, said connections each including a coaxial cable connected to said main input terminals through capacitance, and connections, including capacitance, between each of said pairs of main output terminals and said pairs of subsidiary output terminals respectively, said four-terminal networks each comprising a switch device for giving to such network two alternative constitutions, the first of which comprises two shunt capacitance elements and a further capacitance element in series in at least one of the connections between said shunt capacitance elements and the second of which comprises a shunt capacitance.

9. A band pass filter including an input and an output inductor, connections for feeding energy to at least part of the input inductor, and other connections for withdrawing energy from at least part of the output inductor, a four terminal network coupling said two inductors, said network comprising at least one main series capacitor connected between one terminal of each inductor and the remainder of said network, the remainder of the network including at least one shunt capacitor connected at all times in shunt directly thereacross, on the network side of said main series capacitors, at least two ancillary capacitors and switching means for interconnecting said ancillary capacitors to one another and into said network in alternative manner, in one manner at least two ancillary capacitors being connected in series with each other, and the group being shunted across the network, between the main series capacitors, and in the other manner, at least one ancillary capacitor being placed in series between the two already mentioned main series capacitors, and at least one other ancillary capacitor being shunted across the network within the main series capacitor.

10. A filter according to claim 3, wherein both said connections between said main and subsidiary input terminals include capacitance.

11. A filter according to claim 3, wherein both said connections between said main and subsidiary output terminals include capacitance.

RENAT TERLECKI.
RONALD CRAIG LEIGH.

No references cited.